United States Patent [19]

Collins, Jr.

[11] 4,053,853
[45] Oct. 11, 1977

[54] REPETITIVELY PULSABLE TRAVELING WAVE LASER

[76] Inventor: Carl B. Collins, Jr., 1214 Cloverdale, Richardson, Tex. 75080

[21] Appl. No.: 605,410

[22] Filed: Aug. 18, 1975

[51] Int. Cl.$^2$ .............................................. H01S 3/097
[52] U.S. Cl. ............................................ 331/94.5 PE
[58] Field of Search ........................ 331/94.5; 330/4.3

[56] References Cited

U.S. PATENT DOCUMENTS

| | | | |
|---|---|---|---|
| 3,389,348 | 6/1968 | DeMaria | 331/94.5 Q |
| 3,571,745 | 3/1971 | Altman et al. | 331/94.5 PE |
| 3,571,746 | 3/1971 | DeTemple et al. | 331/94.5 PE |
| 3,753,152 | 8/1973 | Pettipiece | 331/94.5 PE |
| 3,821,664 | 6/1974 | Godard et al. | 331/94.5 PE |
| 3,864,643 | 2/1975 | Waynant | 331/94.5 PE |

*Primary Examiner*—William L. Sikes
*Attorney, Agent, or Firm*—Hubbard, Thurman, Turner & Tucker

[57] ABSTRACT

A system for producing repetitive stimulated emission pulses of coherent electromagnetic radiation which operates in a traveling wave mode is disclosed. Each pulse of coherent electromagnetic energy is produced by applying a single high voltage pulse to a plurality of pulse transmission lines of progressively greater electrical lengths which are connected at spaced points to electrodes extending parallel to and disposed on opposite sides of a discharge channel which contains a laser type medium. As a result, the pulse is applied to successive points along the discharge channel as the stimulated radiation wave front approaches the respective points, providing optimum efficiency. A number of such systems can be cascaded to produce theoretically unlimited power. In the preferred embodiment, the transmission lines are strip transmission lines formed by printed circuit techniques ad include impedance matching connections at the electrodes to provide enhanced efficiency. The rapid rise pulse is applied to the transmission lines by a thyratron or other switching device.

8 Claims, 7 Drawing Figures

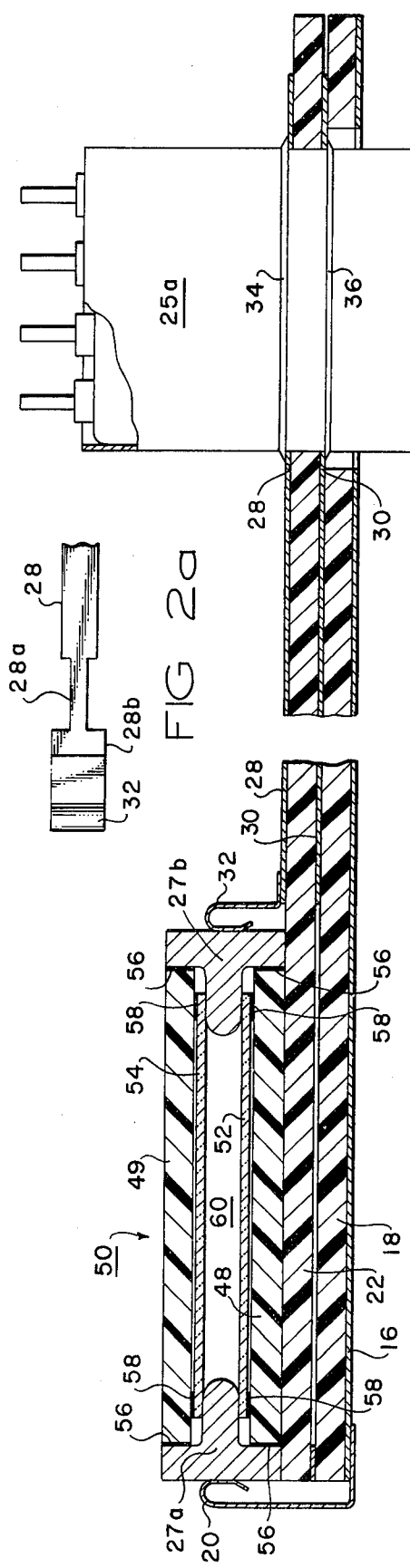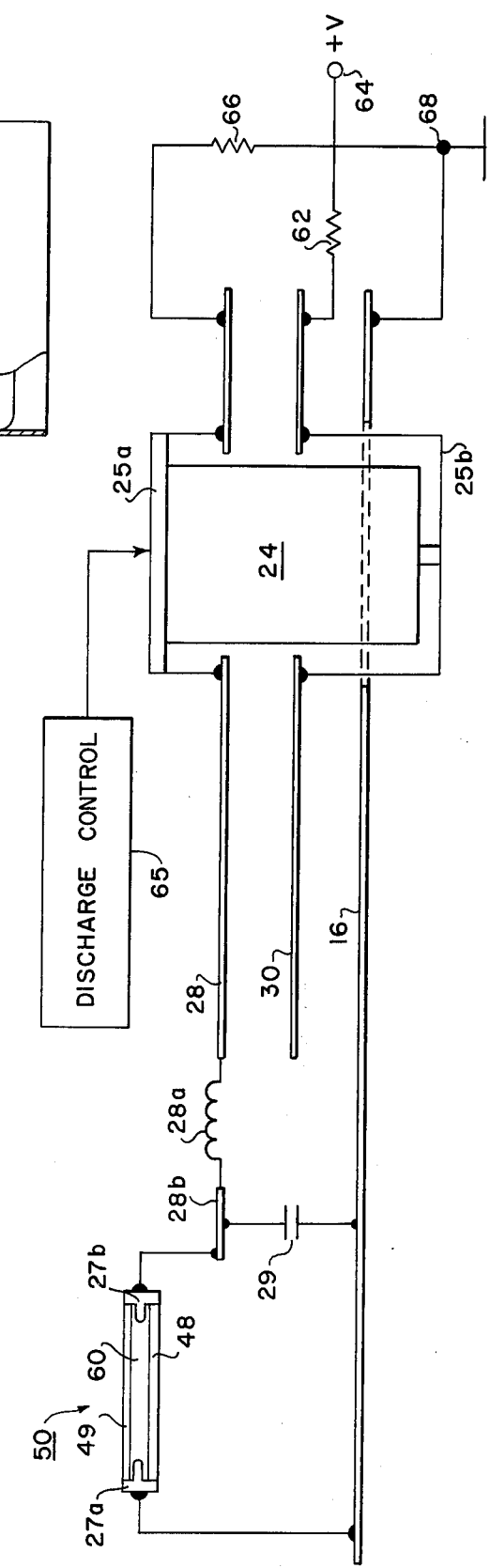

REPETITIVELY PULSABLE TRAVELING WAVE LASER

The government has rights in this invention pursuant to Grant No. GF-443 awarded by the National Science Foundation.

This invention relates generally to the amplification by stimulated emission of electromagnetic radiation by devices commonly referred to as lasers, masers, irasers, etc., and in particular relates to such a device which operates in the traveling wave mode and yet is capable of generating repetitive pulses of such radiation at highly useful repetition rates.

Devices for light amplification by stimulated emission of radiation, microwave amplification by stimulated emission of radiation, and infrared amplification by stimulated emission of radiation, commonly called lasers, masers, and irasers, and related devices are collectively hereinafter referred to generally as lasers.

An electric discharge reaching relatively high current density with an extremely fast initial rise is required to produce an output pulse from a laser medium. In one type of laser, this electric discharge is applied to an anode at one end of the laser discharge channel and a cathode at the other end of the channel, and the discharge occurs longitudinally in the channel. This type laser is said to have longitudinal electrode geometry. On the other hand, if the cathode and anode are disposed along the sides of the laser discharge channel, the laser is said to have a transverse electrode geometry. In either case, the electric discharge is applied simultaneously to all of the lasing medium. This limits the power of the device because the emission period of the medium at the end of the device terminates or reaches an inefficient level before the coherent electromagnetic wave reaches that portion of the medium.

Traveling wave lasers have been proposed which would progressively stimulate the lasing medium along the path of the wave front as the wave front progresses through the medium so that the coherent wave front is always passing through the lasing medium at the peak of excitation of the medium, thus obtaining optimum efficiency.

Such traveling wave lasers require a transverse discharge which moves along the length of the discharge channel at the same rate as the stimulated radiation wave so as to reinforce the resultant pulse of coherent radiation. The state of these devices is summarized in "A Traveling Wave Excitation of High Powered Gas Lasers" by John D. Shipman, Jr., in the *Applied Physics Letters*, Volume 10, No. 1, 1 Jan. 1967 and in "An Integrated Nanosecond Pulse Generator and Laser" in *Physica Scripta*, Volume 4, Pages 215—220, 1971, by Hans E. B. Andersson. All previous traveling wave lasers have been one-shot devices because of the necessity of using breakdown type dielectric switches to establish the necessary rapid rise time of the electric discharge through the laser medium. In the prior art traveling wave lasers, it was also necessary to use very high voltage sources for stimulating the longitudinal laser systems.

In accordance with the present invention, a repetitive pulsing traveling wave laser which is not inherently limited in output power is provided. The basic laser unit can be cascaded with other similar units to further increase the power of the repetitive pulses of coherent radiant energy. The repetition rate of the present invention is limited only by the repetition rate of the power supply and the discharge device such as a thyratron.

In accordance with another important aspect of the invention, a pulse transmission line arrangement is provided for effectively doubling the voltage from the source as it is applied to the transverse electrodes of the laser channel. Additionally, in the preferred embodiments, the system is fabricated of strip transmission lines on an integrated circuit board which provides a compact and relatively inexpensive system for commercial applications. Further, the repetitively pulsable traveling wave laser of the present invention is applicable to substantially all lasing media and thus is not limited to the generation of energy of any particular frequency.

Other features of the design of the repetitively pulsable traveling wave laser assembly and its component parts are specifically set out in the following detailed description and the appended drawings, which illustrate preferred embodiments of this invention.

FIG. 2a is an enlarged top view of an impedance matching device of FIG. 2;

FIG. 3 is a cross-sectional view taken on line 3—3 of FIG. 2;

FIG. 4 is an electrical equivalent circuit diagram of the laser of FIG. 1;

Figure 1:
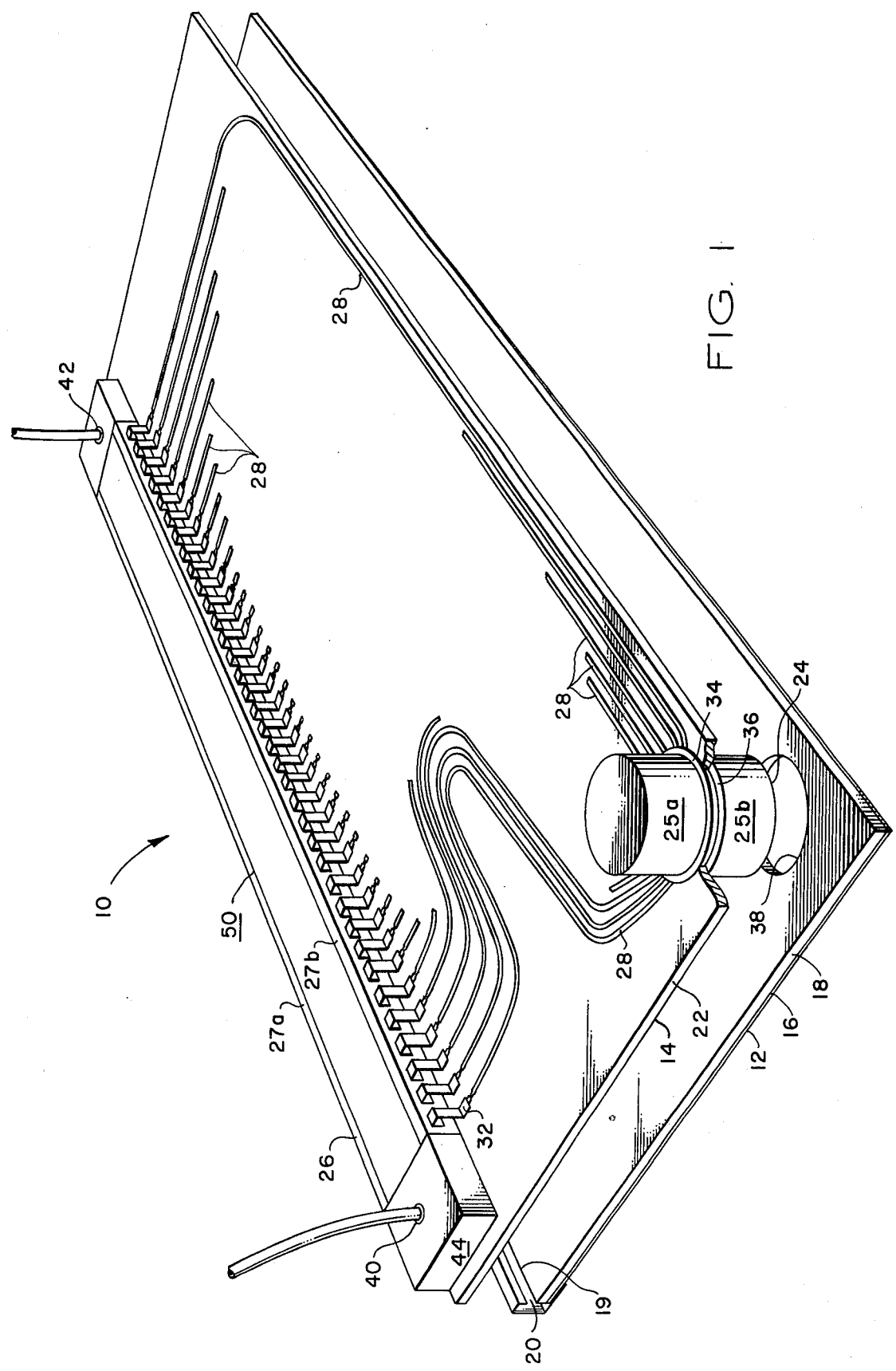
FIG. 1 is an exploded perspective view, partially broken away, of a repetitively pulsable traveling wave laser in accordance with this invention.

Referring now to the drawings, a traveling wave laser assembly in accordance with this invention is designated generally by the reference numeral 10 in FIG. 1. The laser assembly includes a lower board assembly 12, and a top board assembly 14. The lower board assembly 12 includes a continuous copper or other metallic film which forms a transmission line ground plane 16 on a dielectric sheet 18, which may be a conventional phenolic printed circuit board material. The ground plane 16 is electrically connected along edge 19 with a continuous metallic contact 20 which engages one electrode 27a of a conventional laser discharge channel indicated generally by the reference numeral 50 which will be described in detail.

The upper board assembly 14 includes a phenolic printed circuit board 22, a thyratron 24, and a discharge channel 50 of conventional construction. The discharge channel 50 includes a ground electrode 27a and a stimulating electrode 27b. A plurality of strip transmission lines indicated collectively by the numeral 28 connect the thyratron 24 to the stimulating electrodes. The strip lines 28 are formed on the top surface of the printed circuit board 22, and a corresponding number of shadowing strip lines, indicated collectively by the reference numeral 30, are formed on the bottom surface of printed circuit board 22. The shadowing strip lines 30 cannot conveniently be shown in FIG. 1 but are shown in FIGS. 3 and 4. The primary strip lines 28 have a width selected to provide the desired impedance to match the output from the thyratron in order to provide maximum power transfer and produce a sharply rising pulse to the electrodes of the discharge channel. Each strip line 28 includes a short necked section 28a which provides an inductance which connects the strip line to a wider pad 28b which forms one plate of a capacitor, both for the purpose of better matching the relatively low impedance of the discharge channel after initial ionization of the gas. The shadow strip lines 30 lie on the opposite side of the insulating board from the primary strip lines 28 and follow the same path and are accordingly the same length, but preferably are of maximum width permitted by the geometry of the board while maintaining the necessary electrical separation. Each connector 32 connects the pad 28a of one of the primary strip lines 28 to a point along the stimulating electrode 27b of the discharge channel 26. The ends of the shadow strip lines 30 are electrically open, i.e., not connected to anything, and may or may not extend under the inductor section 28a and capacitor section 28b, depending upon the required impedance values to obtain a good match.

The thyratron 24 includes a cathode connector 25a and an anode connector 25b. A narrow ring 34 formed on top of board 22 connects the cathode connector 25a of the thyratron 24 to all of the strip lines 28, and a similar ring 36 formed on the bottom of the board connects the anode connector 25b of the thyratron 24 to the shadow strip lines 30 (not shown). The lower board assembly 12 has a cut-out 38 to receive the thyratron 24 in order to make a compact assembly. When assembled as shown in the simplified sectional view of FIG. 3, connector 20 connects the ground plane 16 to the ground electrode 27a of the discharge channel 50.

The discharge channel 50 also includes a gas inlet 40 and gas outlet 42 for circulating fresh lasing gas through the discharge channel in the conventional manner and a non-discharge window 44 and a quartz discharge window 46.

Figure 2:
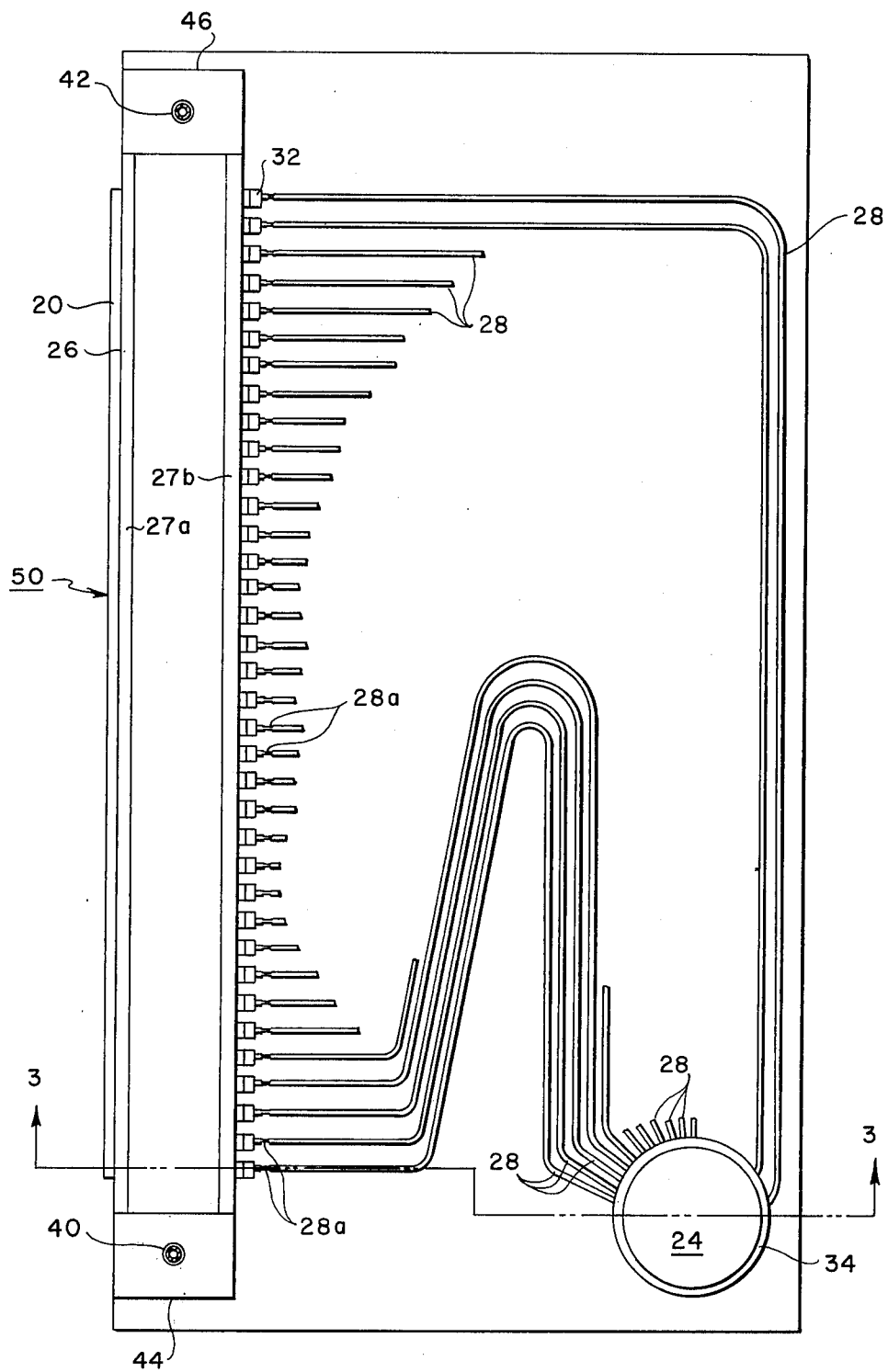
FIG. 2 is a top view of the laser of FIG. 1.

The progressively longer paths of the strip lines 28 are illustrated generally in FIG. 2. The different paths of the strip lines 28 are chosen so that the strip line 28 connected to the contactor 32 nearest to the non-discharge window 44 of the laser channel 26 is the shortest, and each successive strip line has a progressively greater length with the longest strip line being connected to the spring contactor 32 nearest the discharge window 46 of the discharge channel 26. The shadow strip lines 30 on the underside of the printed circuit board 22 follow patterns identical to those of strip lines 28 so as to form a series of strip transmission lines. Each of the strip lines 28 is connected at one end on the conducting ring 34 and at the opposite end on one of the connectors 32. Each shadow strip line 30, on the other hand, is connected to the anode connector ring 36 but is electrically open at the opposite end adjacent the discharge channel to achieve a voltage doubling as will hereafter be described in greater detail.

Additional details of the discharge channel 26 are illustrated in the sectional view of FIG. 3. The discharge channel 26 includes a bottom insulating plastic plate 48, a top insulating plastic plate 49, a bottom glass plate 52 and a top glass plate 54. The plastic plates 48 and 49 are each bonded along one edge to the extruded metal ground electrode 27a with an adhesive 56 and along the opposite edges to the other extruded metal electrode 27b with an adhesive 56. The glass plates 52 and 54 are bonded to the plastic plates 48 and 49 by adhesives 58 and 59. It can thus be seen that the construction of the discharge channel 26 is such as to form a discharge chamber 60 which is filled with a lasing medium.

The electrical equivalent of one transmission line including a primary strip line 28, the inductor sections 28a, a shadow strip line 30 and the ground plane 16 of the system 10 is illustrated in FIG. 4. The capacitor 29 represents the capacitance formed between the pad 28b and ground plane 16, and also that of the two series capacitance formed with shadow line 30 is extended between these two plates of the capacitor. The shadow strip line 30 is connected by the anode connector 25b and a resistor 62 to a D.C. voltage source 64. Strip line 28 is connected by the cathode connector 25a and resistor 66 to ground 68. Of course, the ground plane 16 connects directly to the system ground 68. The voltage source 64 in series with the resistor 62 forms a charging means for the thyratron 24.

In operation, the ground plane 16 and the primary strip lines 28 and, therefore, both electrodes 27a and 27b of the discharge channel are initially at ground potential. The shadow strip lines 30, on the other hand, are charged to the potential of the voltage source. When the thyratron 24 is triggered by a pulse from a discharge control means 65, the anode contact ring 25b is electrically shorted to the cathode contact ring 25a. The ends of all the strip lines 28 are thus simultaneously shorted to the ends of all the shadow strip lines 30 adjacent the thyratron. As a result, a current pulse travels down each transmission line formed by a strip line 28 and the corresponding shadow strip line 30. Since the shadow lines 30 transition occurs from the positive voltage, and ground plane 16 still rests at the ground potential, the resulting voltage of the pulse that travels down each strip line has a magnitude almost twice that of the source potential, when measured between the respective strip line 28 and the ground plane.

Since each strip transmission line 28 has a different effective transmission length from the other strip lines 28, the voltage pulses reach the different connectors 32 at progressively later times so as to discharge through the laser gas at progressively delayed times. The pulses are timed sequentially to arrive at the successive stimulating electrode so that the age of the ionized gas is at an optimum when the electromagnetic wave (i.e., light wave) initiated at the first end of the tube reaches the particular point along the discharge channel. As a result, the electrical discharge proceeds along the discharge channel at the speed of light so that the coherent light pulse is generated in an ionized zone of optimum age, thus theoretically providing infinite length and infinite power. However, these theoretical values are limited by electrical considerations, which limit the effective length of the channel, even with the increased voltage provided by the strip line arrangement and impedance matching device previously described.

From an electrical standpoint, the thyratron 24 provides a practical, high power, high speed, high repetition rate point discharge device. The configuration of the narrow connector rings apply this pulse evenly to the transmission lines which are impedance matched to the thyratron. The inductor 28a and capacitor 29 match the relatively high impedance of the thyratron and transmission lines, typically 200 ohms, to the relatively low impedance of the gas in the discharge channel after ionization, typically 10 ohms.

Figure 5:
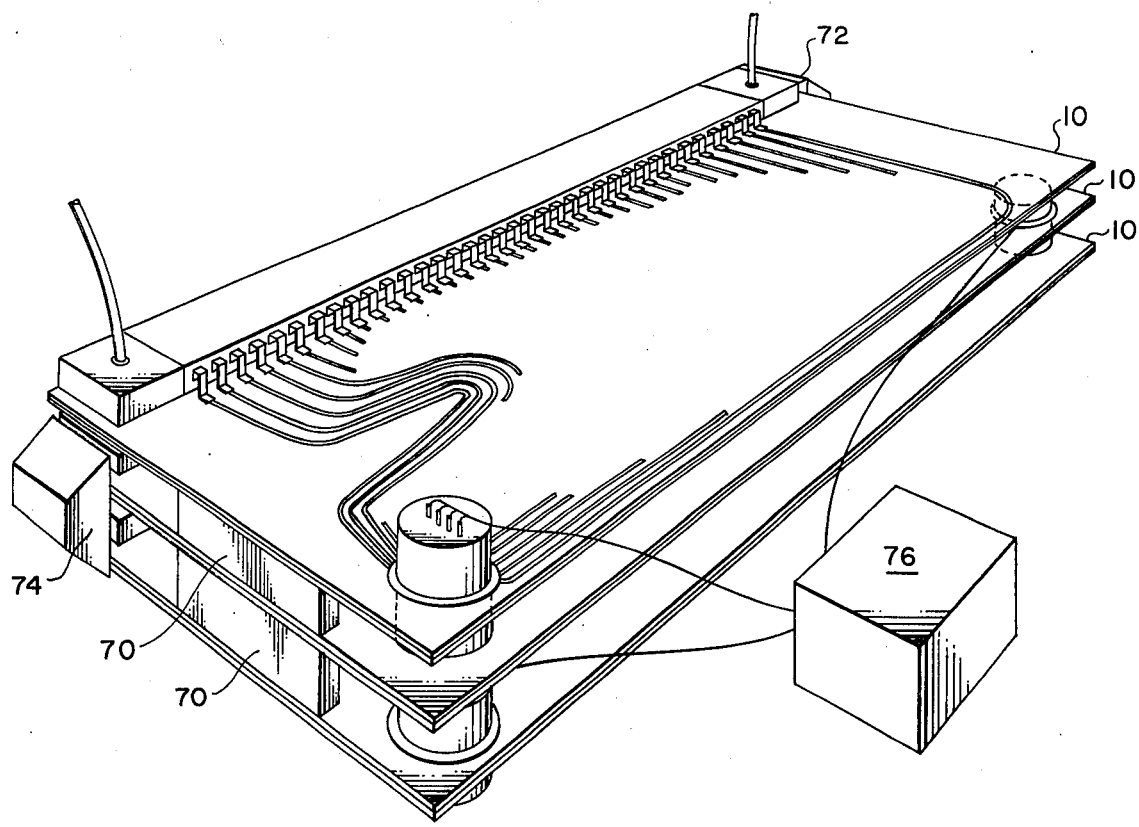
FIG. 5 is a perspective view of another embodiment of the invention.
Figure 6:
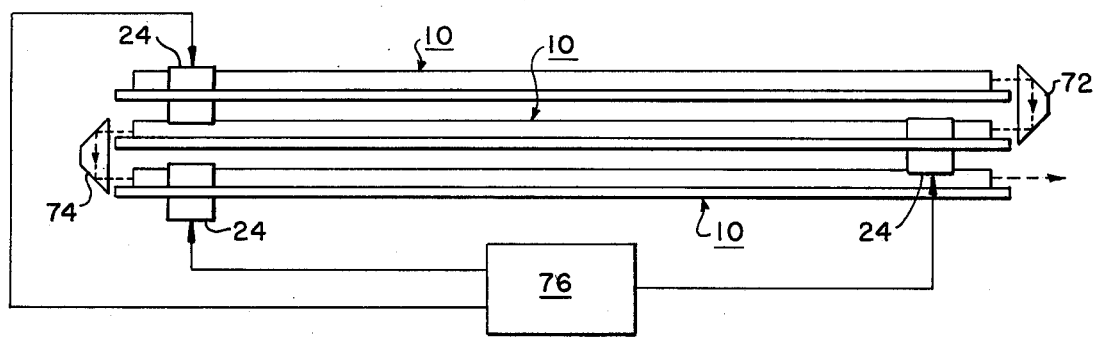
FIG. 6 is a side view of the laser of FIG. 5.

Another embodiment of the invention is illustrated in FIGS. 5 and 6. This embodiment utilizes three repetitively pulsable traveling wave lasers similar to assembly 10 in FIG. 1 which are stacked and separated by spacers 70. A prism 72, or other radiation directing means, is situated so as to direct the output of the top laser to the input to the middle laser and a second prism 74 directs the output pulse of the middle laser to the input to the bottom laser. The final output pulse of radiation emerges from the discharge channel of the bottom laser as shown in FIG. 6. A timing system 76 sequences the discharges from the three thyratrons 24 in such a way that the output pulse of radiation is reinforced from one laser to the next. Thus, a repetitively pulsable traveling wave laser such as the one shown in FIGS. 5 and 6 has an effective discharge channel length of three times that of the individual discharge channel.

It will be appreciated that other electrical discharge devices for producing high voltage, very rapid rise time, high current, localized electrical pulses may be substituted for the thyratron 24, and that coaxial cables or other pulse transmission lines may be substituted for the strip transmission lines and still fall within the broader aspects of the present invention, although these components are particularly suited for commercial applications.

Although preferred embodiments of the invention have been described in detail, it is to be understood that various changes, substitutions and alterations can be made therein without departing from the spirit and scope of the invention as defined by the appended claims.

What is claimed is:

1. A traveling wave laser comprising
    a discharge channel containing a laser medium having a wave initiating end and an output end;
    electrical pulse generating means for repetitively producing a localized elecrical pulse;
    a plurality of discrete pulse transmission lines of progressively greater lengths coupling the pulse generating means to the discharge channel at spaced points extending from the initiating end to the output end for sequentially applying each pulse to the points along the discharge channel in advance of a coherent electromagnetic wave propagating through the discharge channel from the initiating end to the output end; and,
    each of the discrete pulse transmission lines including a first conductor, a second conductor, and a third conductor, the first and second conductors being separated by a first layer of a dielectric medium thereby defining a first wave propagation path along the first and second conductors, and the second and third conductors being separted by a second layer of a dielectric medium thereby defining a second wave propagation path along the second and third conductors, the second conductor being electrically coupled to the pulse generating means to receive an electrical charge for the storage of electrical energy in the first and second wave propagating paths, the discharge channel being electrically coupled to the first and third conductors to receive electrical waves propagated through the first and second propagation paths in response to an abrupt discharge of electrical energy stored therein.

2. A repetitively pulsing, traveling wave laser comprising:
    A laser medium;
    an elongated discharge channel containing the laser medium having first and second spaced electrode means extending longitudinally of the channel, the channel having first and second ends;
    a plurality of discrete pulse transmission lines each having first and second conductors, one end of each transmission line being coupled to the electrodes at intervals spaced from the first end to the second end, the first conductor of each pair being coupled to the first electrode and the second being coupled to the opposed portion of the second electrode;
    pulse means coupled to the other ends of the transmissions lines for simultaneously applying each of a series of electrical pulses to the other ends of the transmission lines such that each electrical pulse propagates along the transmission lines and discharges between the adjacent portions of the electrodes;
    the transmission lines successively coupled to the electrode from the first to the second ends having progressively longer effective transmissions lengths for applying the electrical pulses to successive points along the length of the channel in sequence with the passage of light from the first to the second end through the channel.

3. The laser of claim 2 wherein the first conductors of the transmission lines comprise a plurality of transmission strip lines formed on a printed circuit on a surface of an insulating board and the other conductors comprise a ground plane spaced from the strip lines.

4. The laser of claim 3 further characterized by
    a shadow strip line disposed between each transmission strip line and the ground plane and having an electrically open end adjacent the first electrode, and wherein
    the pulse means including means connected to the shadow lines for precharging the shadow lines to a voltage and then shorting the respective shadow lines to the other ends of the strip transmission lines.

5. A traveling wave laser comprising an elongated discharge channel containing a laser medium and having a wave initiating end and a wave output end and a pair of spaced electrodes extending longitudinally of the channel;
    pulse means for repetitively producing a localized electrical pulse including a controllable breakdown device;
    a plurality of discrete pulse transmission lines of progressively greater lengths coupling the pulse means to the discharge channel at spaced points extending from the initiating end to the output end for sequentially applying each pulse to the spaced points along the discharge channel in advance of a coherent electromagnet wave propagating through the discharge channel from the initiating end to the output end;
    each discrete transmission line comprising a primary conductor, a shield conductor and a center conductor disposed between and capacitively coupled to theprimary conductor and the shield conductor, one end of the primary conductor being direct current connected to one of the electrodes, the corresponding one end of the shield conductor being direct current connected to the other electrode, and the corresponding one end of the center conductor being open to direct current, the shield conductor being connected to ground, the other end of the primary conductor being connected by a resistance to ground, the other end of the center conductor being connected to a voltage supply, and the breakdown device being connected to simultaneously short the other ends of all of the primary conductors to the other ends of all of the center conductors.

6. The traveling wave laser of claim 5 wherein
    each pulse transmission line has a comparatively high impedance such that the collective impedance of the pulse lines is better matched to the pulse means and further including impedance transforming means connecting each transmission line to the discharge channel having a comparatively low output impedance for better matching the impedance of the discharge channel after the laser medium has been ionized.

7. The traveling wave laser of claim 6 wherein each impedance matching means comprises an inductance connected in series between the primary conductor and said one of the electrodes and a capacitor coupling said one of the electrodes to the shield conductor.

8. The traveling wave laser of claim 7 wherein the primary conductor and the center conductors are strip lines formed by printed circuit boards and the shield conductor is a ground plane formed on a printed circuit board and each of the inductances is a relatively narrow section in the strip line forming the respective primary conductors and the capacitor is a relatively wide section in the strip line forming the respective primary conductors between the relatively narrow section and the electrode.

* * * * *

UNITED STATES PATENT OFFICE
CERTIFICATE OF CORRECTION

Patent No. 4,053,853            Dated October 11, 1977

Inventor(s) Carl B. Collins, Jr.

It is certified that error appears in the above-identified patent and that said Letters Patent are hereby corrected as shown below:

Abstract, line 17, "ad" should be —and—.

Column 1, line 31, "elecric" should be —electric—.

Column 5, line 59, "A" should be —a—.

Column 6, line 51, "theprimary" should be—the primary—.

Signed and Sealed this

Twenty-sixth Day of September 1978

[SEAL]

Attest:

RUTH C. MASON
*Attesting Officer*

DONALD W. BANNER
*Commissioner of Patents and Trademarks*